United States Patent [19]

Morrin, II

[11] 4,020,462
[45] Apr. 26, 1977

[54] METHOD AND APPARATUS FOR FORM REMOVAL FROM CONTOUR COMPRESSED IMAGE DATA

[75] Inventor: Thomas Harvey Morrin, II, San Jose, Calif.

[73] Assignee: International Business Machines Corporation, Armonk, N.Y.

[22] Filed: Dec. 8, 1975

[21] Appl. No.: 638,566

[52] U.S. Cl. .............. 340/146.3 AE; 340/146.3 H; 340/324 A
[51] Int. Cl.$^2$ ........................................ G06K 9/00
[58] Field of Search ... 340/324 A, 324 AD, 146.3 H, 340/146.3 AH, 146.3 AE, 146.3 Q; 355/41

[56] References Cited
UNITED STATES PATENTS

| | | | |
|---|---|---|---|
| 3,166,636 | 1/1965 | Rutland et al. ................ | 340/324 A |
| 3,496,543 | 2/1970 | Greenly ...................... | 340/146.3 H |
| 3,710,321 | 1/1973 | Rubenstein .............. | 340/146.3 AH |
| 3,744,899 | 7/1973 | Sable .................................. | 355/41 |
| 3,820,067 | 6/1974 | Shepard ..................... | 340/146.3 H |
| 3,863,218 | 1/1975 | Oka et al. ................ | 340/146.3 AE |
| 3,872,462 | 3/1975 | Lemelson ...................... | 340/324 A |

*Primary Examiner*—Leo H. Boudreau
*Attorney, Agent, or Firm*—Otto Schmid, Jr.

[57] ABSTRACT

An apparatus for removing form (background) information from an image for data compression; and for adding the form information during reconstruction of the image.

Each object in an image is compressed by contour following of the exterior and interior borders of the object, and encoded in chain link form. Each object in the image as it is compressed is correlated with the appropriate object in the form image by comparing the encoded objects with the already stored encoded objects of the form. If there is a match, the image object which matches the form is deleted from the compressed image. Since the order in which the objects are encountered is known, it is only necessary to correlate each image object with at most a single form object. The correlation includes comparing the starting points of the contour information, the perimeter of the object (the length of its border chain) and the object area. The comparisons are made within a predetermined acceptable tolerance. If the variable image data overlaps some of the form image data, the object is retained in the compressed image. During reconstruction of the image, the form and image data are combined using a technique similar to logical OR operation.

6 Claims, 6 Drawing Figures

4,020,462

METHOD AND APPARATUS FOR FORM REMOVAL FROM CONTOUR COMPRESSED IMAGE DATA

BACKGROUND OF THE INVENTION

This invention relates to image data compression and decompression and more particularly to the deletion of form (background) data from an image during data compression and the addition of form data to compressed image data during decompression.

The present invention utilizes data which is in contour form encoded in accordance with the apparatus described in U.S. Pat. No. 3,987,412, Ser. No. 535,453, entitled "A Method and Apparatus for Image Data Compression Utilizing Boundary Following of the Exterior and Interior Borders of Objects", by T. H. Morrin, filed 1/27/75, and issued Oct. 19, 1976. In that prior apparatus, a mechanism for compression and reconstruction of an arbitrary image is described. The image is encoded by object such that the compressed image is a list of objects. Image manipulation operations can therefore be done directly on compressed data. One such operation which is the subject of the present invention is form removal or the correlation of an image with a template. This information generally refers to fixed preprinted information; i.e., text, rulings, logos on a document; for example, an insurance company form or gas station credit card receipt. In addition to the form information the image contains variable data information; such as, name, address, billing amount, etc. In a compression process it is desirable to strip image data of all form information as it is necessary to store form information only once, since this information does not change from document to document. During a decompression operation, it is necessary to add the form information to the compressed image so that the resultant decompressed image contains all of the information in the original document.

In the prior art, stripping of forms is accomplished by optical means. The form information is printed in a special color. Selective detection during the scanning process filters out the special color printing and thus drops the form electronically.

The optical method has the disadvantage that documents must be preprinted using special inks and special scanners. Furthermore, form data cannot be stripped from the information on a document which is, for example, a copy of the printed document.

SUMMARY OF THE INVENTION

It is accordingly an object of this invention to provide a method and apparatus for stripping form information from image data during compression of the image and for adding form information to compressed information to reconstruct the image.

Briefly, the above object is accomplished in accordance with the invention by encoding object boundaries of an image containing both form information and variable information. The encoded objects in chain link form are compared with prior encoded objects of predetermined form information. The encoded objects are transferred to a utilization device (storage or transmission device) with the exception that encoded objects that match within a predetermined tolerance with the prior encoded form objects are inhibited from transfer. This effectively strips the form information from the variable information.

In order to reconstruct the original image, the stripped form information is stored in contour form. The stored form contour information is then added to the variable image compressed information and the composite image is decompressed to provide a reconstructed image which consists of both the variable information and the form information.

The invention has the advantage that known background information can be dropped from a scanned image which is in digital form.

Another advantage is that background information can be stripped from an image without using any special image scanning technique.

The foregoing and other objects features and advantages of the invention will be apparent from the following more particular description of a preferred embodiment of the invention as illustrated in the accompanying drawings.

DESCRIPTION OF THE INVENTION

Figure 1:
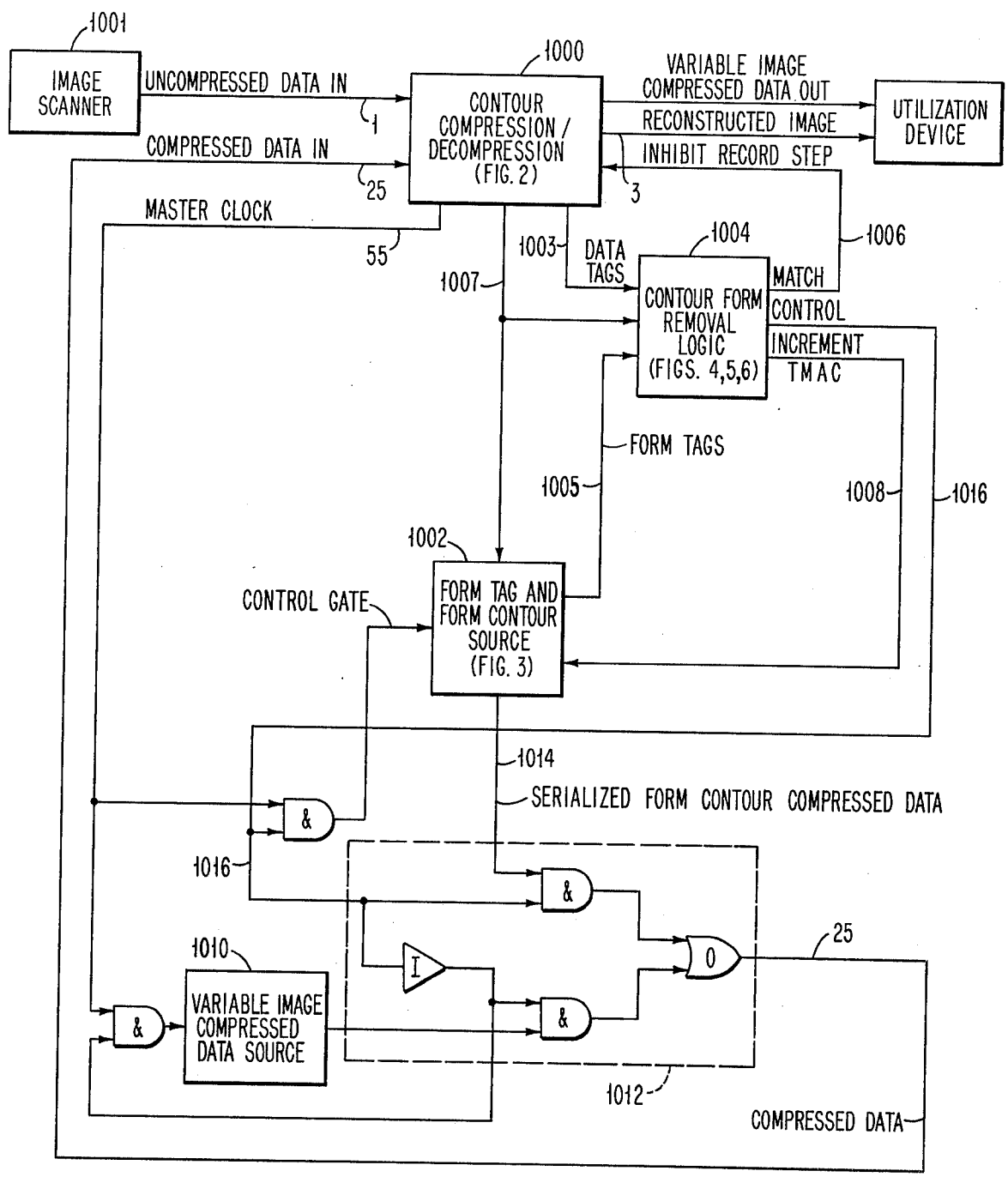
FIG. 1 is an overall block diagram of the apparatus in which the invention is embodied.

Referring now to FIG. 1, the method and means for stripping predetermined background information from an image is shown. The image scanner 1001 produces uncompressed data derived from an image which contains both background information and variable information. Contour compression apparatus 1000 encodes object boundaries of the image in chain link form resulting in a series of data tags. The background information is encoded in chain link form and the encoded objects (form tags) of the background information are stored in a form tag source 1002. The form tags and the data tags are compared in the contour form removal logic 1004. When one of the objects encountered by the contour compression logic 1000 matches one of the objects representing background information in the source 1002, a signal occurs on the match line 1006 which is utilized to inhibit the transfer of that compressed object from the contour compression logic 1000 to the utilization device.

Reconstruction of an image is accomplished from the compressed data in source 1010 by combining this compressed data with the compressed background information which is stored in form contour source 1002. The background information and the variable information are merged by means of an electronic switch 1012 and the compressed result is transferred to the contour decompression logic 1000. The composite compressed data is decompressed and the result is a reconstructed image containing both variable data and background data which is transferred to the utilization device.

DETAILED DESCRIPTION

This invention relates to data which is in contour form, generated as described in the above-identified T. H. Morrin application which is incorporated herein by reference. References in the present application to material found in the above-identified patent application utilize the same reference numerals.

Figure 2:
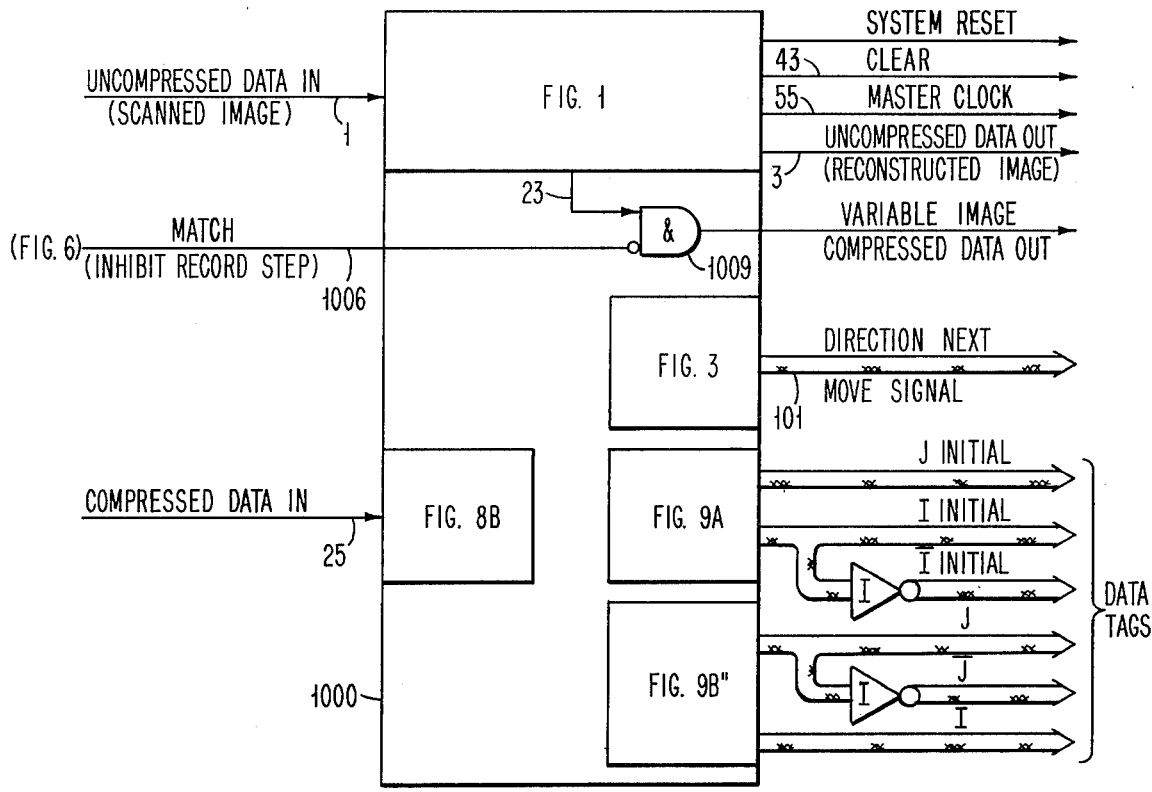
FIG. 2 is a diagram of the contour compression/decompression apparatus of the above identified patent application, Ser. No. 535,453.

Referring now to FIG. 1, contour compression/decompression block 1000 refers to the entire apparatus described in the above-identified patent application. FIG. 2 shows the logic block 1000 in more detail showing the exact figure numbers of the above-identified application to which the various lines correspond.

An image scanner 1001 provides incoming digital information on "uncompressed data" in line 1. The data contains in it certain form data, the content of which is predetermined and is common to a number of scanned document images. It is desirable to store only the variable information on a document and then recombine this information with the known form information when it is desired to reconstruct the image. The uncompressed data is applied by input 1 to the contour compression/decompression apparatus 1000. The contour coded image produced within the logic 1000 is a stream of data describing, in turn, the borders of the objects in the image in chain link form. Relative registration of each document is accomplished by any well known means, such as placing a registration mark in the upper left-hand corner of the document, which mark is always found first. The contour coded data takes the form of data tags on output line 1003. The data tags are presented to contour form removal logic 1004. A form tag memory 1002 has stored in it the predetermined data in contour format. This data, the form tags, is synchronized with the data tags and presented to the contour form removal logic 1004.

Each object in an image, as it is compressed, is correlated at logic 1004 with the appropriate object in the form image. If there is a match, the object is deleted from the compressed image. Since the order in which the objects are encountered is known and determined by the closeness of the top of an object to the top of the image document page, it is only necessary to correlate each incoming object with a single form object.

Contour form removal logic 1004 performs this correlation by noting that the starting points in $x y$ coordinates are close together and that the chain lengths or the perimeters of the objects are the same within predetermined tolerances. Additionally, the areas of the two objects are compared within tolerances.

Whenever there is a match between the form tags and the data tags, this indicates that the information within the data tags is to be deleted since it corresponds to form information. This is accomplished by a signal occurring on the match line 1006 which inhibits the output of the contour compression/decompression logic 1000 so that the corresponding compressed form information does not appear on the data output line. Additionally, every time there is a match, the increment TMAC line 1008 is energized to thereby step the tag memory address counter (TMAC) to the next tag memory address.

To reconstruct the original image, it is necessary to combine the form image with the variable image information. The variable image compressed data source 1010 supplies the variable image data to an electronic switch 1012. The electronic switch 1012 switches between the variable image compressed data and the serialized form contour compressed data 1014 from the memory 1002 under control of a control line 1016. The output of the electronic switch is compressed data 25 which is provided to the compressed data input of the contour compression/decompression logic 1000.

Every time the initial starting point of an object in contour form is reached, the control line 1016 is energized. This control line stays energized until a signal indicating the end of an object contour occurs. The energization of the control line causes the output of the variable image data source 1010 to be degated and the output 1014 which is the serialized form contour compressed data to be energized and passed through the switch 1012. Thus, the compressed data representing the form contour is merged with the compressed data representing the variable image. The result is a reconstructed image which is passed on to the utilization device. The serialized form contour compressed data is read out of the form contour memory locations in random access memory 1002 under control of master clock line 55 whenever the control line 1016 is energized. Since the data are assembled in a random access memory in block 1000 prior to transfer to the utilization device, the order in which objects for decompression are encountered is not critical.

The contour compression/decompression logic block 1000 shown in FIG. 1, is fully described in the above-identified co-pending patent application. The various interconnections necessary to connect that apparatus with the present invention are shown in FIG. 2 by a block diagram which shows where corresponding lines enter and leave the various figures of the co-pending application. The numbering system in the present application corresponds with the numbering system in the co-pending application.

Figure 3:
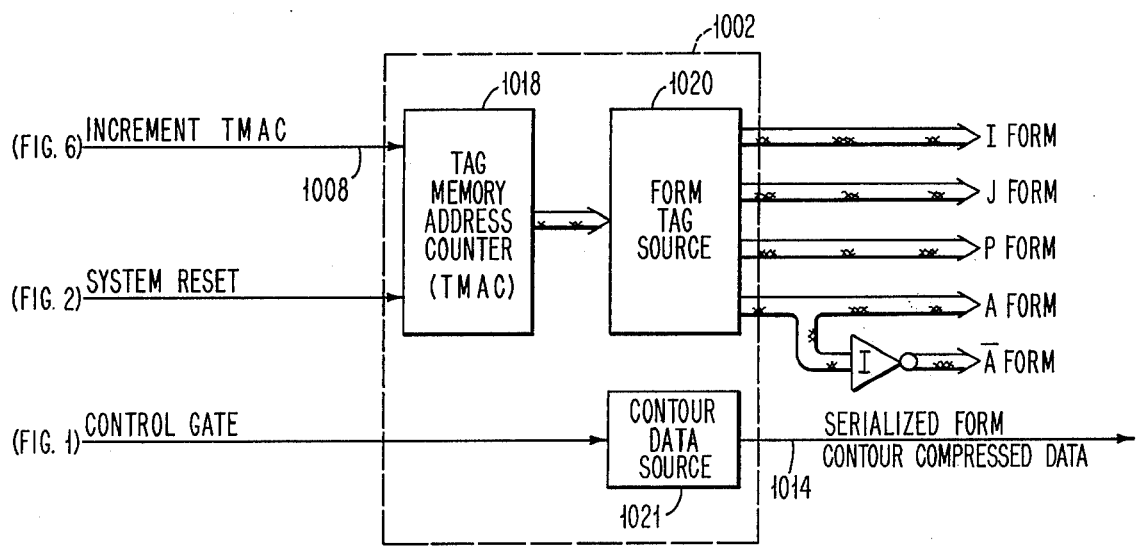
FIG. 3 is a more detailed diagram of the form tag and form contour source 1002 shown in FIG. 1.

Referring to FIG. 3, the form tag and contour random access memory 1002 of FIG. 1, is shown in more detail. It consists of a tag memory address counter (TMAC) which is stepped by the increment TMAC line 1008. The output of the TMAC selects memory address locations in the form tag source 1020, which may be a random access memory. The output of the memory locations which hold the form tag information are the I and J start points of the form object, the perimeter information, and the area information.

Figure 4:
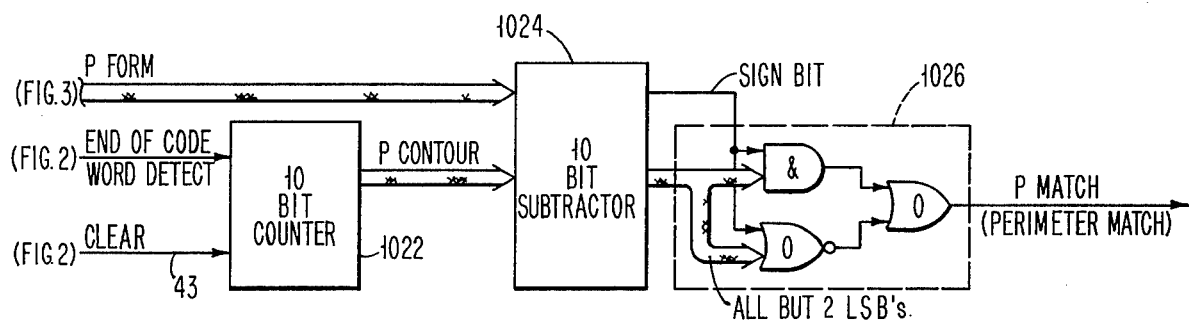
FIGS. 4, 5, and 6, are more detailed block diagrams of the contour form removal logic 1004 shown in FIG. 1.
Figure 5:
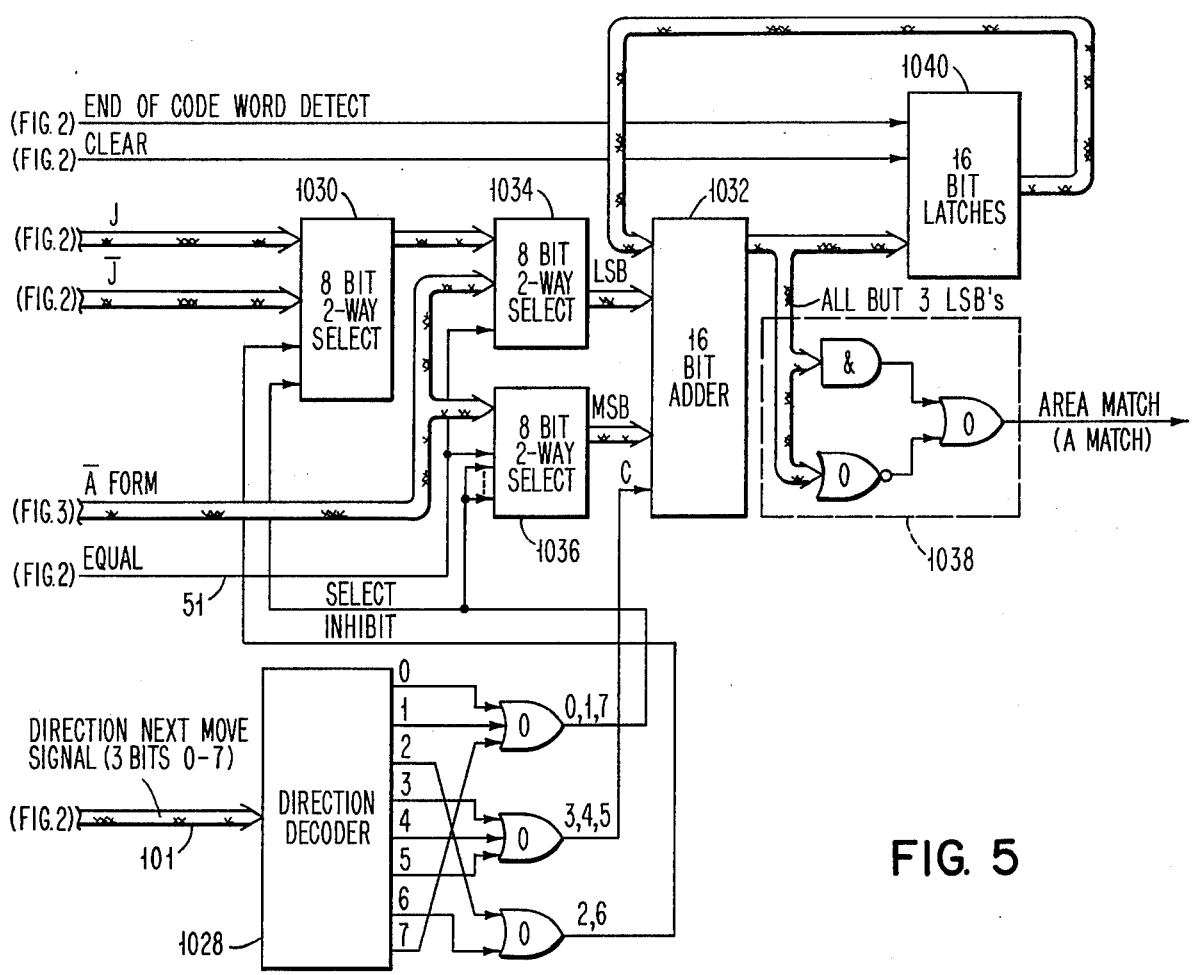
Figure 6:
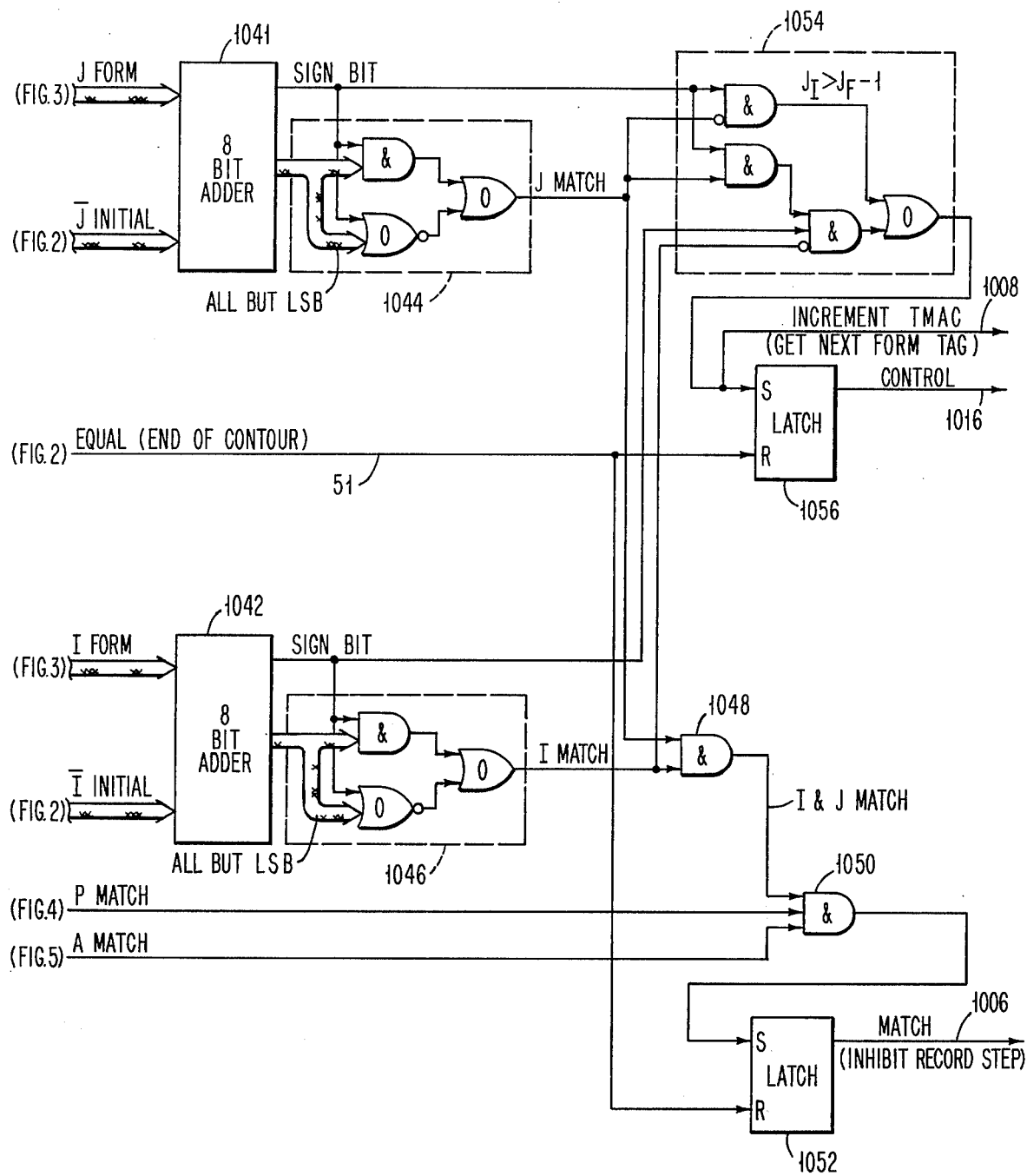

The contour form removal logic 1004 shown in FIG. 1, is shown in more detail in FIGS. 4, 5 and 6. In FIG. 4, the perimeter information from the form tag source shown in FIG. 3 is submitted to a 10 bit subtractor. The perimeter of the contour object is determined by counting the number of steps produced by the contour compression/ decompression logic in a 10 bit counter 1022. The perimeter of the contour is subtracted from the perimeter of the form in the 10 bit subtractor 1024. A comparison is performed on the output of the subtractor in comparator 1026. An output from the comparison logic indicates that the perimeters match.

The comparison logic 1026 has an input all but the two least significant bits (LSB) from the 10 bit subtractor 1024 and a sign bit line which when in the DOWN level indicates that the number is a positive number and in the UP level a negative number. Thus, if the number in the 10 bit subtractor is greater than −4 and less than zero, there is an output from the AND circuit. If the number is less than +4 and greater than or equal to zero, there is an output from the OR invert. These two outputs are combined in an OR circuit to provide a perimeter match output from the compare logic 1026.

In FIG. 5, a comparison is made to determine if the areas of the image object encountered and the form object match to within a predetermined tolerance. As more fully described in the above identified patent application, an image is described by parameters including I, J coordinates and ΔI, ΔJ unit vectors which specify the location of object boundaries in an X,Y coordinate image.

To obtain the area of an object which is encountered, the J values are accumulated in an accumulator. Using a contour follower, when the follower is moving to the right, J values are added to each other and accumulated and when the follower is moving to the left, the J values are subtracted from the accumulator. Straight up and down movement of the follower is not recorded as this does not contribute to the area parameter.

The direction of the follower is indicated by the direction decoder 1028 which decodes the direction of the next move signal which is a 3 bit binary number indicating eight different directions of movement. The direction is indicated counter clockwise from 0 through 7 where 0 is directly to the right. Thus, the outputs of the direction decoder 0, 1, and 7 indicate right hand movement; 3, 4, and 5 indicate left hand movement; and 2 and 6 represent up and down movement, respectively.

The J values from the contour coding circuitry shown in FIG. 2, enter an 8 bit two-way select circuit 1030. J values are selected for addition and $\bar{J}$ values are selected for subtraction (subtraction is accomplished in an adder by complementing one input to the adder and energizing the carry input to the adder). Thus, a select line for the O, 1, and 7 output from the decoder is used when positive to select J and when negative to select $\bar{J}$. The 3, 4, 5 output from the decoder energizes the carry input to a 16 bit adder 1032. The 2, 6 output from the direction decoder 1028 is used to inhibit the input to the 8 bit two-way select so that up and down motion causes no change in the accumulator. Thus, as J values are encountered for right hand motion, the select line is positive and the J value passes through the 8 bit select 1030 through an 8 bit select 1034 to the 16 bit adder. The output of the 16 bit adder is gated into 16 bit latches 1040 which are fed back to the 16 bit adder to perform an accumulation function. This operation continues every time a move is made and thus a new J value is to be added to the adder. When motion is in a left hand direction as signified by a positive output on the 3, 4, 5 line the select line is negative thus selecting the $\bar{J}$ value and the carry input to the 16 bit adder is positive, thus performing a subtract function. The accumulation in the adder continues until the entire contour has been encoded as signified by an output of the equal line 51. This output causes the predetermined stored area of the form to be subtracted from the contour area stored in the 16 bit adder. (For subtraction, the complement or $\bar{A}$ form is used.) If the accumulated area of the encoded object is equal to the area of the form, the result in the 16 bit adder will be zero. To allow for a tolerance, all but the three least significant bits are submitted to a compare circuit 1038 so that if the contents of the adder are equal to the area of the form to within a tolerance (±7 in this example) an output occurs on the area match line.

Referring now to FIG. 6, the initial values of an encoded object are compared with the stored initial values of the pre-encoded form. This is done by means of 8 bit adders 1041 and 1042 which subtract the I and J initial values with the stored I and J form values. These are compared to within a predetermined tolerance in compare circuits 1044, 1046 which examine all but the least significant bits of the output of the subtractors. Thus, if the I and J values match to within this tolerance (±1 in this example) an output occurs on the J match line and the I match line.

If there is a match, an output occurs from AND 1048. This output is combined with the P match and the A match lines in AND 1050 to turn on a latch 1052 which indicates that the contour encoded object matches the pre-encoded form object to within a given tolerance.

The match line 1006 output from latch 1052 is inverted to degate AND 1009 in FIG. 2, thus inhibiting the transfer of objects that match.

Additionally, whenever the object being encoded has an initial J value which is greater than the form J value, it is necessary to increment the tag memory address counter in order to fetch the next form tag from the form tag source 1020 shown in FIG. 3. This comparison is done by comparator 1054. The output from the comparator 1054 also turns on a latch 1056 which energizes the control line 1016 previously described with respect to FIG. 1.

SUMMARY

What has been described is a method and apparatus for stripping predetermined background information from an image. This is accomplished by encoding object boundaries of the image in a machine usable form, such as, by contour follower encoding techniques. The encoded objects as they are encountered are compared with prior similarly encoded objects of the predetermined background information by comparing parameters, such as, area and perimeter to within some predetermined tolerance. The objects as they are encoded are transferred to a utilization device and the transfer is inhibited whenever an encoded object matches the background information.

An image is reconstructed from a compressed image by combining compressed background information which is encoded by the contour follower technique with variable information which has been encoded by the same technique and then decompressing the composite compressed image.

While the invention has been particularly shown and described with reference to a preferred embodiment thereof, it would be understood by those skilled in the art that various changes in form and details may be made therein without departing from the spirit and scope of the invention.

What is claimed is:

1. A method of stripping predetermined background information from a composite image containing a plurality of objects having defined boundaries, said composite image having predetermined background information containing a plurality of objects and variable information containing a plurality of objects comprising the steps of:
    encoding object boundaries of said background information into contour data;
    storing said encoded object boundaries of said background information in an addressable memory;
    scanning said composite image in such a way as to encounter objects in a fixed order;
    encoding object boundaries of said composite image into contour data;
    addressing said addressable memory so as to read out said encoded background contour data in the same fixed order as said scanned composite image objects are encountered;

comparing said composite image contour data with said background information contour data; and inhibiting the transfer to a utilization device of those encoded objects of said composite image whose contour data matches the contour data of said encoded objects of said background information to within a predetermined tolerance.

2. A method of stripping predetermined background information from a composite image containing a plurality of objects having defined boundaries, said composite image having predetermined background information containing a plurality of objects and variable information containing a plurality of objects, comprising the steps of:

encoding object boundaries of said background information into contour data, said data including parameters defining object location and shape;

storing said encoded object boundaries of said background information in an addressable memory;

scanning said composite image in such a way as to encounter objects in a fixed order;

encoding object boundaries of said composite image into contour data, including parameters defining object location and shape;

reading said encoded background contour data from said addressable memory in the same order as said scanned composite image objects are encountered;

comparing at least one of said parameters of said composite image contour data with the corresponding one of said parameters of said background information contour data; and inhibiting the transfer to a utilization device of those encoded objects of said composite image whose at least one parameter matches the corresponding one of said parameters of said encoded objects of said background information, to within a predetermined tolerance.

3. A method of combining predetermined background information containing a plurality of objects with variable image information containing a plurality of objects to form a composite image comprising the steps of:

storing said predetermined background information in contour data form in a source;

storing variable image information in contour data form in said source;

reading said background contour data from said source object by object;

merging said background contour data with said variable image information contour data to produce a compressed data composite which is a representation of a full image containing both said background information and said variable information; and decompressing said compressed data to thereby produce a reconstructed image, said image containing both said predetermined background information and said variable image information.

4. Apparatus for stripping predetermined background information from an image containing a plurality of objects having defined boundaries, said composite image having background information containing a plurality of objects and variable information containing a plurality of objects comprising:

means for encoding object boundaries of said image into contour data form, said means including a compressed data output;

means for storing prior similarly encoded object boundaries of predetermined background information;

means connected to said encoding means and said storing means for comparing said encoded object boundaries with said prior similarly encoded object boundaries of said predetermined background information, said means generating a match signal output upon the condition that said encoded object boundaries match said prior similarly encoded object boundaries within a predetermined tolerance; and means connected to said comparing means output and said compressed data output of said encoding means, responsive to said match signal, for inhibiting the transfer to a utilization device of encoded object boundaries of said image that match said prior encoded object boundaries of predetermined background information.

5. Apparatus for combining predetermined background information with variable information to form an image containing both said background information and said variable information comprising:

first means for providing a source of background information in contour compressed form;

second means for providing a source of variable image data in contour compressed form;

means responsive to said first and second means for combining said background compressed data and said variable image compressed data into a composite compressed data output; and means responsive to said composite compressed data output for decompressing said compressed data to thereby produce a reconstructed image.

6. Apparatus for stripping predetermined background information from an image containing a plurality of objects having defined boundaries, said image being scanned by an image scanner which produces uncompressed data derived from said image, which data contains both background information containing a plurality of objects and variable information containing a plurality of object, said apparatus comprising:

contour compression means for encoding object boundaries of said image in chain link form resulting in a series of data tags;

a form tag source for storing encoded objects of said background information; and form removal means responsive to said contour compression means and said form tag source for comparing said data tags and said form tags;

whereby when one of the object boundaries of said image encountered by said contour compression means matches one of the encoded objects representing background information in said form tag source, a match signal occurs which may be utilized to inhibit the transfer of that compressed object which matches one of the encoded objects representing background information from the contour compression means to a utilization device.

* * * * *